(12) United States Patent
Lackner et al.

(10) Patent No.: US 8,857,608 B2
(45) Date of Patent: Oct. 14, 2014

(54) LINK MEMBER HAVING REPLACEABLE WEAR COMPONENT

(75) Inventors: Joseph M. Lackner, Medina, MN (US);
Paul Steinhoff, Stephens City, VA (US);
Jonathan R. Lasecki, Strasburg, VA (US)

(73) Assignee: Ashworth Bros., Inc, Fall River, MA (US)

( * ) Notice: Subject to any disclaimer, the term of this patent is extended or adjusted under 35 U.S.C. 154(b) by 141 days.

(21) Appl. No.: 13/562,820

(22) Filed: Jul. 31, 2012

(65) Prior Publication Data

US 2014/0034458 A1 Feb. 6, 2014

(51) Int. Cl.
*B65G 17/38* (2006.01)
*B65G 17/08* (2006.01)
*B65G 17/40* (2006.01)

(52) U.S. Cl.
CPC ............... *B65G 17/08* (2013.01); *B65G 17/40* (2013.01)
USPC .......................................... 198/853; 198/778

(58) Field of Classification Search
CPC .. B65G 21/18; B65G 2207/25; B65G 17/064; B65G 17/08; B65G 17/40
USPC ................... 198/778, 848, 850–853
See application file for complete search history.

(56) References Cited

U.S. PATENT DOCUMENTS

| | | |
|---|---|---|
| 2,547,581 A | 4/1951 | Kearns |
| 2,619,843 A | 12/1952 | Kampfer |
| 3,231,070 A | 1/1966 | Müller |
| 3,278,000 A | 10/1966 | I'Anson |
| 3,881,593 A | 5/1975 | Mushovic et al. |
| 3,944,059 A | 3/1976 | Garvey |
| 4,050,323 A | 9/1977 | I'Anson |
| 4,114,467 A | 9/1978 | Petershack |
| 4,490,970 A | 1/1985 | Curl |
| 4,518,077 A | 5/1985 | Ronco et al. |
| 4,754,872 A | 7/1988 | Damkjaer |

(Continued)

FOREIGN PATENT DOCUMENTS

| | | |
|---|---|---|
| DE | 2 048 480 | 4/1972 |
| DE | 2 150 078 | 4/1973 |

(Continued)

OTHER PUBLICATIONS

International Search Report, International Patent Application No. PCT/US2013/052739, mailed Oct. 25, 2013.

(Continued)

*Primary Examiner* — James R Bidwell
(74) *Attorney, Agent, or Firm* — Nixon Peabody LLP; Jeffrey L. Costellia

(57) ABSTRACT

A link member having a replaceable wear component and a conveyor belt comprising a link member having a replaceable wear component are described. One aspect of the present invention provides a sacrificial or replaceable wear component that is attached to a conveyor belt. The conveyor belt can be any type of conveyor belt, such as a grid-type or flat-wire conveyor belt. The wear component is attached by mechanical or other means to allow its removal after a certain wear limit has been achieved. A new component can be installed to bring the conveyor belt to nearly new condition. This will extend belt life because only the wear component needs to be replaced, rather than the entire belt.

73 Claims, 6 Drawing Sheets

(56) References Cited

U.S. PATENT DOCUMENTS

| | | | |
|---|---|---|---|
| 5,280,833 A * | 1/1994 | Robin | 198/831 |
| 5,303,818 A | 4/1994 | Gruettner et al. | |
| 5,566,817 A | 10/1996 | Meeker | |
| 5,738,205 A | 4/1998 | Dræbel | |
| 5,775,480 A * | 7/1998 | Lapeyre et al. | 198/831 |
| 5,782,340 A * | 7/1998 | Dolan | 198/841 |
| 5,899,322 A | 5/1999 | Gamble, Jr. | |
| 5,954,187 A | 9/1999 | Hager | |
| 6,216,854 B1 * | 4/2001 | Damkjær et al. | 198/853 |
| 6,237,750 B1 | 5/2001 | Damkjaer et al. | |
| 6,371,284 B1 | 4/2002 | Pasch | |
| 6,578,704 B1 * | 6/2003 | MacLachlan | 198/778 |
| 7,234,589 B2 | 6/2007 | Sedlacek | |
| 7,419,051 B2 | 9/2008 | Damkjær | |
| 7,490,715 B2 | 2/2009 | Girg et al. | |
| 7,841,462 B2 * | 11/2010 | Layne et al. | 198/831 |
| 7,987,974 B2 * | 8/2011 | Montgomery et al. | 198/853 |
| 2003/0042116 A1 | 3/2003 | Gundlach et al. | |
| 2005/0183936 A1 | 8/2005 | Neely et al. | |
| 2007/0181409 A1 | 8/2007 | Damkjaer | |
| 2012/0037480 A1 | 2/2012 | Meulenkamp et al. | |

FOREIGN PATENT DOCUMENTS

| | | |
|---|---|---|
| DE | 199 07 306 C1 | 7/2000 |
| DE | 101 18 537 A1 | 11/2002 |
| DE | 10 2005 002 160 A1 | 8/2006 |
| EP | 1 614 644 A1 | 1/2006 |
| FR | 1 234 348 | 10/1960 |
| FR | 1 251 538 | 1/1961 |
| GB | 196050 | 4/1923 |
| GB | 977781 | 12/1964 |
| GB | 995391 | 6/1965 |
| GB | 2 091 200 | 7/1982 |
| WO | WO-81/00244 A1 | 2/1981 |

OTHER PUBLICATIONS

Written Opinion of the International Searching Authority, International Patent Application No. PCT/US2013/052739, mailed Oct. 25, 2013.

* cited by examiner

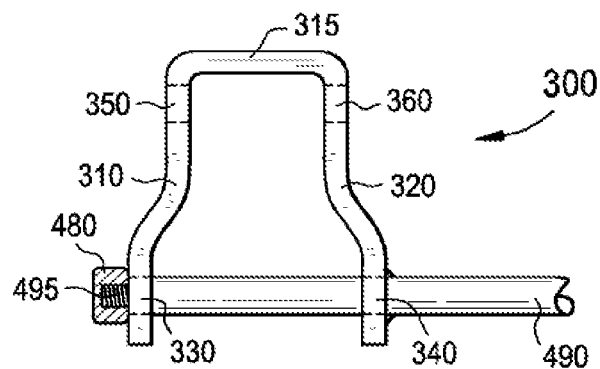
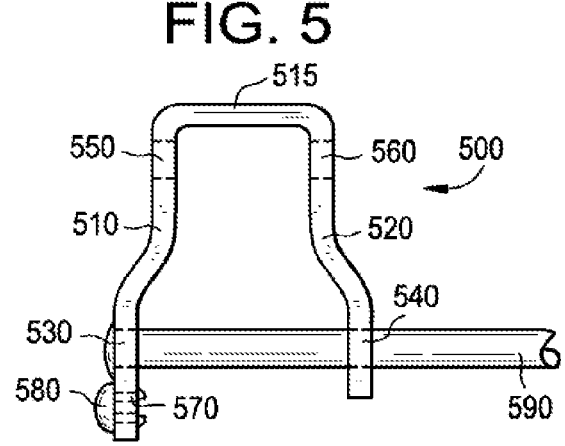

LINK MEMBER HAVING REPLACEABLE WEAR COMPONENT

BACKGROUND OF THE INVENTION

1. Field of the Invention

The present invention relates to conveyor belts, and in particular, to a link member having a replaceable wear component.

2. Description of Related Art

Conveyor belt systems are commonly used in various industrial fields for material handling and processing purposes. For instance, conveyor systems are used within food processing systems in which food items are placed on the support surface of a conveyor belt and processed, while being conveyed from one location to another. Various types of conveyor belts exist, including modular conveyor belts, which are especially popular in food processing systems. Moreover, conveyor systems are often used in a helical accumulator such as that disclose in U.S. Pat. No. 5,070,999 to Layne et al. which allows storage of a large number of items in the conveyor system.

Conveyor belts used in spiral ovens are driven by a spiral cage made with evenly spaced vertical bars or a smooth cage surface. Due to the high temperatures required in an oven, the cage surface that would normally be covered with plastic in ambient or freezing applications must instead be made with stainless steel. A typical conveyor belt used in food processing equipment would also be made of stainless steel.

Spiral theory requires that the spiral cage in these applications be driven slightly faster than the belt edge. This difference in speed results in adhesive wear between the inside belt edge and the rotating cage surface. Conveyor belts used in these applications are made with links and rods. The rods terminate at either end with either a weld to the link or a button head welded to the link. A continuous series of these elements are assembled to create an endless conveyor belt.

The wear that occurs between the rotating cage surface and the inside belt edge results in the reduction of thickness of the button head. If this wear goes unabated, the button head and weld thin to the point that the weld between the link and rod fails, leading to operation failure of the entire belt. This results in both product loss and machine down time. If wear of the inside button heads is noticed upon inspection, users, as required, will "repair" the belts by adding additional weld material to the button head in order to extend the belt life. This "repair" process is timely, costly and inconsistent.

SUMMARY OF THE INVENTION

Thus, there exists a need for a cost-effective wear component that interfaces between the links and rods and the spiral cage. There also exists a need for a wear component that is quickly and easily replaceable. Further, there exists an unfulfilled need for such a wear component that can be made to fit a variety of shapes, sizes and types of conveyor belts.

In view of the foregoing, one aspect of the present invention provides a sacrificial or replaceable wear component that is attached to a conveyor belt. The conveyor belt can be any type of conveyor belt, such as a grid-type or flat-wire conveyor belt. The wear component is attached by mechanical or other means to allow its removal after a certain wear limit has been achieved. The wear component can be made of plastic, ceramic or any material machined or molded.

Thus, an advantage of embodiments of the present invention is that the wear component can be removed and a new component can be installed to bring the conveyor belt to nearly new condition. This will extend belt life because only the wear component needs to be replaced, rather than the entire belt. This saves time and money, and provides a new uniform wear surface upon which the belt can be driven.

The wear component can be rounded, oval or flat, and can be used in standard or extended leg links. In one embodiment, the component is "snapped" into a slot in the extended leg of the link. In another embodiment, the component is snapped around or into the leg of the link. In still another embodiment, the component encapsulates the end of the leg of the link. Alternatively, the component can be attached with a special adhesive.

According to one embodiment, a conveyor belt of the present invention comprises a plurality of link members, a plurality of pivot rods, and a plurality of wear components. Each link member comprises first and second leg portions and a connecting portion that connects the first and second leg portions at a distal end thereof. Each first and second leg portion comprises a first opening at a proximal end and a second opening at a distal end. Each of the plurality of pivot rods is received in the first opening of each leg portion of one of the plurality of link members and the second opening of each leg portion of an adjacent link member. Each pivot rod includes a weld to one of the plurality of link members at an end thereof. Each wear component is attached proximate to the weld to one of the plurality of link members or one of the plurality of pivot rods.

A link member is also described. The link member comprises first and second leg portions, a connecting portion and a wear component. Each leg portion comprises a first opening at a proximal end and a second opening at a distal end. The first leg portion further comprises a third opening. The connecting portion connects the first and second leg portions at the distal end thereof. The wear component is received in the third opening.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a top view of a link member having a wear component in accordance with another embodiment of the invention.

FIG. 5 is a top view of an extended leg link member having a wear component in accordance with an embodiment of the invention.

DETAILED DESCRIPTION

A link member having a replaceable wear component is described. In the following description, for purposes of explanation, numerous specific details are set forth in order to provide a thorough understanding of the exemplary embodiments. It is apparent to one skilled in the art, however, that the present invention can be practiced without these specific details or with an equivalent arrangement.

Figure 1:
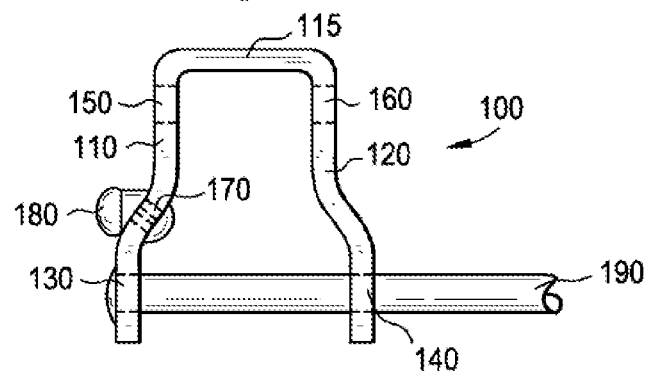
FIG. 1 is a top view of a link member having a wear component in accordance with an embodiment of the invention.

Referring now to the drawings, wherein like reference numerals designate identical or corresponding parts throughout the several views, FIG. 1 is a top view of a link member 100 having a wear component 180, in accordance with one implementation of the invention. Link member 100 has a first leg portion 110, a connecting portion 115 and a second leg portion 120. Connecting portion 115 connects first leg portion 110 and second leg portion 120 at a distal end of link member 100. First leg portion 110 and second leg portion 120 extend proximally from connecting portion 115. Although shown and described as being substantially equal in length, it is contemplated that first leg portion 110 and second leg portion 120 can have different lengths. For example, link member 100 can be an extended leg link member in which first leg portion 110 extends further proximally (i.e., has a longer length) than second leg portion 120.

First leg portion 110 has a first opening 130 and a second opening 150. Second leg portion 120 has a first opening 140 and a second opening 160. First opening 130 of first leg portion 110 and first opening 140 of second leg portion 120 are positioned at a proximal end of link member 100. Second opening 150 of first leg portion 110 and second opening 160 of second leg portion 120 are positioned at a distal end of link member 100.

Pivot rod 190 is received in first opening 130 of first leg portion 110 and first opening 140 of second leg portion 120. In this embodiment, pivot rod 190 is welded directly to first leg portion 110 at first opening 130. It is contemplated, however, that pivot rod 190 may include a button head (not shown) at an end thereof, which is instead welded to first leg portion 110 or is freestanding. A second pivot rod (not shown) is received in second opening 150 of first leg portion 110 and second opening 160 of second leg portion 120, as well as the first openings of the first and second leg portions of an adjacent link member (not shown). Link member 100 and pivot rod 190 can be made of any material, and can be made of, for example, stainless steel or another metal.

First leg portion 110 includes a third opening 170 in which a wear component 180 is removably positioned. In this embodiment, third opening 170 is positioned between first opening 130 and second opening 150 in first leg portion 110. Wear component 180 has a head portion and two leg portions. The ends of the two leg portions of wear component 180 can have a slightly larger diameter than a central area of the two leg portions in order to retain wear component 180 within third opening 170.

In order to insert wear component 180 into third opening 170, the two legs of wear component 180 can be compressed toward each other while being pushed into third opening 170 until the ends of the leg portions snap into place and the head portion of wear component 180 is positioned against first leg portion 110. Although shown and described with respect to two leg portions, it is contemplated that wear component 180 can have a single leg portion that can be compressed and snapped into place within third opening 170, without the need for a second leg portion. In either embodiment, the head portion of wear component 180 protrudes beyond the weld or button head between pivot rod 190 and first leg portion 110.

Figure 2:
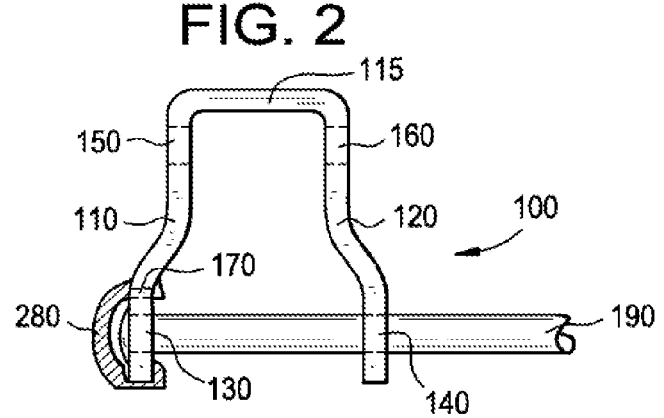
FIG. 2 is a top view of a link member having a wear component in accordance with another embodiment of the invention.

FIG. 2 is a top view of link member 100 having a wear component 280, in accordance with another implementation of the invention. In this embodiment, wear component 280 is C-shaped and is both snapped into third opening 170 of first leg portion 110 and is clipped onto first leg portion 110. As shown in FIG. 2, wear component 280 has two legs connected by an arch that covers the weld between pivot rod 190 and first leg portion 110. As described above, although pivot rod 190 is directly welded to first leg portion 110 in this embodiment, it is contemplated that pivot rod 190 can further include a button head at an end thereof, and that the button head can instead be welded to first leg portion 110 or be freestanding. In those embodiments, the arch of wear component 280 would cover either the weld between the button head of pivot rod 190 and first leg portion 110 or the button head itself.

The first leg of wear component 280 is positioned within third opening 170 of first leg portion 110. Third opening 170 is positioned between first opening 130 and second opening 150 of first leg portion 110. The second leg of wear component 280 has a recessed portion configured to receive the proximal end of first leg portion 110, as well as an extended portion having a greater diameter than the recessed portion in order to retain the second leg of wear component 280 on first leg portion 110. The first leg of wear component 280 has a similar recess and extended portion that allows it to be snapped into third opening 170 and retained therein.

Figure 3:
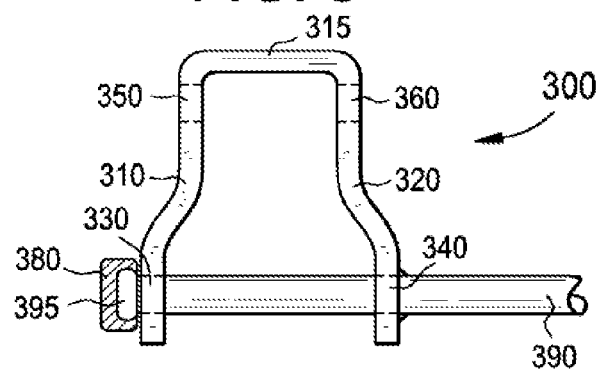
FIG. 3 is a top view of a link member having a wear component in accordance with another embodiment of the invention.

FIG. 3 is a top view of a link member 300 having a wear component 380, in accordance with another implementation of the invention. Similar to link member 100, link member 300 has a first leg portion 310, a connecting portion 315 and a second leg portion 320. Connecting portion 315 connects first leg portion 310 and second leg portion 320 at a distal end of link member 300. First leg portion 310 and second leg portion 320 extend proximally from connecting portion 315. Although shown and described as being substantially equal in length, it is contemplated that first leg portion 310 and second leg portion 320 can have different lengths. For example, link member 300 can be an extended leg link member in which first leg portion 310 extends further proximally (i.e., has a longer length) than second leg portion 320.

First leg portion 310 has a first opening 330 and a second opening 350. Second leg portion 320 has a first opening 340 and a second opening 360. First opening 330 of first leg portion 310 and first opening 340 of second leg portion 320 are positioned at a proximal end of link member 100. Second opening 350 of first leg portion 310 and second opening 360 of second leg portion 320 are positioned at a distal end of link member 300.

Pivot rod 390 is received in first opening 330 of first leg portion 310 and first opening 340 of second leg portion 320. In this embodiment, pivot rod 390 has button head 395. Button head 395 has a larger diameter than first opening 330 of first leg portion 310 and first opening 340 of second leg portion 320. Thus, button head 395 retains pivot rod 390 in first opening 330 of first leg portion 310 and first opening 340 of second leg portion 320.

In this embodiment, pivot rod 390 is welded to second leg portion 320. However, it is contemplated that a weld can be present between button head 395 and first leg portion 310; between pivot rod 390 and first leg portion 310; or that no weld can be present at all. A second pivot rod (not shown) is received in second opening 350 of first leg portion 310 and second opening 360 of second leg portion 320, as well as the first openings of the first and second leg portions of an adjacent link member (not shown). Link member 300 and pivot rod 390 can be made of any material, and can be made of, for example, stainless steel or another metal.

Unlike link member 100, it is not necessary for link member 300 to have a third opening for wear component 380. Instead, wear component 380 is positioned over button head 395. Wear component 380 has a flat portion positioned against the flat surface of button head 395 and two side portions curved around the side surfaces of button head 395. The side portions of wear component 380 can be positioned continuously around the side surfaces of button head 395, or can be placed at any number of locations around the perimeter of button head 395 as needed to secure wear component 380 in place. In other words, button head 395 fits within a recessed area of wear component 380. Wear component 380 has a larger diameter at the end of the side portions proximate to first leg portion 310 than at the center of the side portions, i.e., wear component 380 has a lip at the end of the side portions. Thus, wear component 380 can be pushed onto button head 395 and be retained by the end of the side portions hugging the edges of button head 395.

FIG. 4 is a top view of a link member 300 having a wear component 480, in accordance with another implementation of the invention. Pivot rod 490 is received in first opening 330 of first leg portion 310 and first opening 340 of second leg portion 320. In this embodiment, pivot rod 490 has a threaded end 495 that has a smaller diameter than the remainder of pivot rod 490. However, it is contemplated that threaded end 495 can have the same or a larger diameter than the remainder of pivot rod 490.

In this embodiment, pivot rod 490 is welded to second leg portion 320. However, it is contemplated that a weld can be present between threaded end 495 and first leg portion 310; between pivot rod 490 and first leg portion 310; or that no weld can be present at all. A second pivot rod (not shown) is received in second opening 350 of first leg portion 310 and second opening 360 of second leg portion 320, as well as the first openings of the first and second leg portions of an adjacent link member (not shown). Link member 300 and pivot rod 490 can be made of any material, and can be made of, for example, stainless steel or another metal.

Again, unlike link member 100, it is not necessary for link member 300 to have a third opening for wear component 480. Instead, wear component 480 is threaded or screwed on to threaded end 495. In this embodiment, wear component 480 has a larger diameter than first opening 330 of first leg portion 310 and first opening 340 of second leg portion 320. Thus, wear component 480 retains pivot rod 390 in first opening 330 of first leg portion 310 and first opening 340 of second leg portion 320. In still another embodiment, wear component 480 can be a speed nut or press-on nut (not shown).

FIG. 5 is a top view of an extended leg link member 500 having a wear component 580, in accordance with an implementation of the invention. Extended leg link member 500 has a first leg portion 510 and second leg portion 520. Connecting portion 515 connects first leg portion 510 and second leg portion 520 at a distal end of link member 500. First leg portion 510 and second leg portion 520 extend proximally from connecting portion 515. In this embodiment, first leg portion 510 is longer than second leg portion 520, i.e., extends further proximally than second leg portion 520.

First leg portion 510 has a first opening 530 and a second opening 550. Second leg portion 520 has a first opening 540 and a second opening 560. Second opening 550 of first leg portion 510 and second opening 560 of second leg portion 520 are positioned at a distal end of extended leg link member 500. First leg portion 510 has a third opening 570 positioned at a proximal end of extended leg link member 500. First opening 530 of first leg portion 510 is positioned between third opening 570 and second opening 550 of first leg portion 510. First opening 540 of second leg portion 520 is positioned parallel to first opening 530 of first leg portion 510.

Pivot rod 590 is received in first opening 530 of first leg portion 510 and first opening 540 of second leg portion 520. In this embodiment, pivot rod 590 is welded directly to first leg portion 510 at first opening 530. It is contemplated, however, that pivot rod 590 may include a button head (not shown) at an end thereof which is instead welded to first leg portion 510, or a button head or pivot rod that is instead freestanding without a weld. A second pivot rod (not shown) is received in second opening 550 of first leg portion 510 and second opening 560 of second leg portion 520, as well as the first openings of the first and second leg portions of an adjacent link member (not shown). Link member 500 and pivot rod 590 can be made of any material, and can be made of, for example, stainless steel or another metal.

Wear component 580 is removably positioned in third opening 570 of first leg portion 510. In this embodiment, third opening 570 is positioned further proximally than first opening 530 of first leg portion 510, such that first opening 530 is positioned between third opening 570 and second opening 550. Wear component 580 has a head portion and two leg portions. The ends of the two leg portions of wear component 580 can have a slightly larger diameter than a central area of the two leg portions in order to retain wear component 580 within the third opening 570.

In order to insert wear component 580 into third opening 570, the two legs of wear component 580 can be compressed toward each other while being pushed into third opening 570 until the ends of the leg portions snap into place and the head portion of wear component 580 is positioned against first leg portion 510. Although shown and described with respect to two leg portions, it is contemplated that wear component 580 can have a single leg portion that can be compressed and snapped into place within third opening 570, without the need for a second leg portion. In either embodiment, the head portion of wear component 580 protrudes beyond the weld or button head between pivot rod 590 and first leg portion 510.

Figure 6:
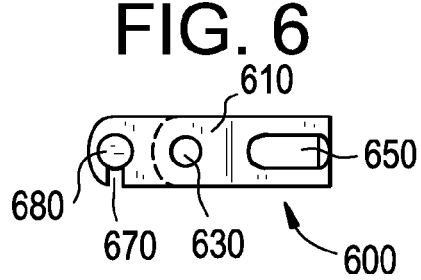
FIG. 6 is a side view of an extended leg link member having a wear component in accordance with an embodiment of the invention.

In the embodiments described above with respect to FIGS. 1-5, the first, second and third openings can be holes, slots or a combination thereof. For example, FIG. 6 is a side view of an extended leg link member 600 having wear component 680, in accordance with an implementation of the invention. In FIG. 6, only first leg portion 610 is shown. First leg portion 610 has a first opening 630 and a second opening 650. Second opening 650 is positioned at a distal end of extended leg link member 600. First leg portion 610 has a third opening 670 positioned at a proximal end of extended leg link member 600. First opening 630 is positioned between third opening 670 and second opening 650. Wear component 680 is removably positioned in third opening 670. As shown in FIG. 6, third opening 670 and second opening 650 are slots, while first opening 630 is a hole. However, any combination of slots, holes, and other openings can be used for the first, second and third openings described herein.

Figure 7:
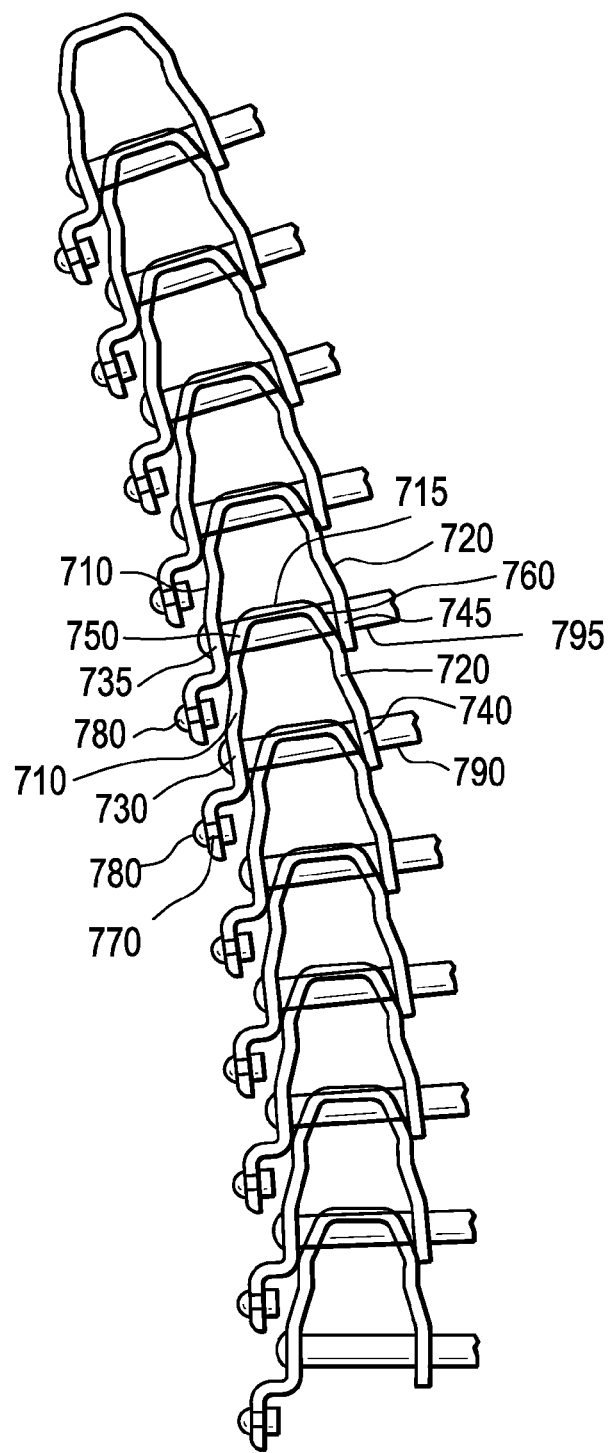
FIG. 7 is a top view of a conveyor belt comprising extended leg link members having wear components in accordance with an embodiment of the invention.

FIG. 7 is a top view of a conveyor belt comprising a plurality of extended leg link members having wear components 780, in accordance with an implementation of the invention. In one embodiment, FIG. 7 is a top view of a conveyor belt comprising a plurality of extended leg link members 600 as shown in a side view in FIG. 6. Each extended leg link member has a first leg portion 710 and a second leg portion 720. A connecting portion 715 connects each first leg portion 710 and second leg portion 720 at a distal end of each link member. First leg portion 710 and second leg portion 710 extend proximally from connecting portion 715. As in FIG. 5, first leg portion 710 is longer than second leg portion 720, i.e., first leg portion 710 extends further proximally than second leg portion 720. Unlike FIG. 5, however, the extended portion of first leg portion 710 also extends in a direction away from the welded end of pivot rods 790.

Each first leg portion 710 of FIG. 7 has a first opening 730 and a second opening 750. Each second leg portion 720 has a first opening 740 and a second opening 760. Second opening 750 of first leg portion 710 and second opening 760 of second leg portion 720 are positioned at a distal end of each extended leg link member. Each first leg portion 710 has a third opening 770 positioned at a proximal end of each extended leg link member. First opening 730 of first leg portion 710 is positioned between third opening 770 and second opening 750 of first leg portion 710. First opening 740 of second leg portion 720 is positioned parallel to first opening 730 of first leg portion 710.

Pivot rod 790 is received in first opening 730 of first leg portion 710 and first opening 740 or second leg portion 720. In this embodiment, each pivot rod 790 is welded directly to first leg portion 710 at first opening 730. It is contemplated, however, that pivot rod 790 may include a button head (not shown) at an end thereof which is instead welded to first leg portion 710, or a button head or pivot rod that is instead freestanding without a weld. It is further contemplated that one or more pivot rods 790 may be alternatively or additionally welded to second leg portion 720 at first opening 740. An adjacent pivot rod 795 is received in second opening 750 of first leg portion 710 and second opening 760 of second leg portion 720, as well as the first openings of the first and second leg portions 735 and 745, respectively, of an adjacent extended leg link member. The extended leg link members and pivot rods can be made of any material, and can be made of, for example, stainless steel or another metal.

Wear component 780 is removably positioned in third opening 770 of each first leg portion 710. Wear component 780 has a head portion, a single leg portion and a central portion between the head portion and the leg portion. The leg portion of wear component 780 has a slightly larger diameter than the central portion in order to retain wear component 780 within the third opening 770.

In order to insert wear component 780 into third opening 770, the central portion of wear component 780 is aligned with a slot (such as slot 670 of FIG. 6). Wear component 780 is then pushed into the slot such that the head portion of wear component 780 protrudes on one side of first leg portion 710, and the leg portion of wear component 780 protrudes on the opposite side of first leg portion 710. Although shown and described with respect to a single leg portion, it is contemplated that wear component 780 can have two or more leg portions that can be compressed and pushed into the slot. In either embodiment, the head portion of wear component 780 protrudes beyond the weld between pivot rod 790 and first leg portion 710 in order to provide a wear surface between the extended link members of the conveyor belt and a spiral cage driving the conveyor belt, as discussed further herein.

Figure 8:
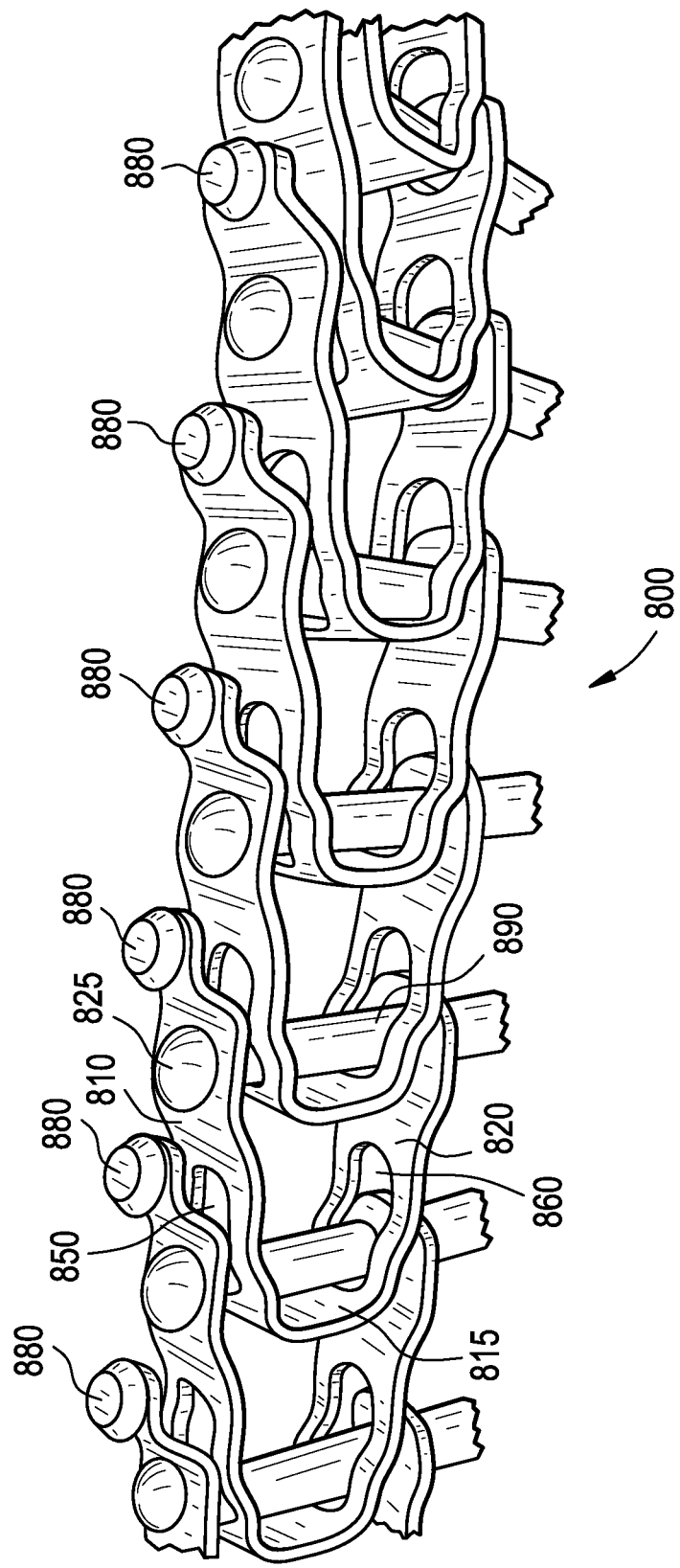
FIG. 8 is a top perspective view of a conveyor belt comprising extended leg link members having wear components in accordance with an embodiment of the invention.
Figure 9:
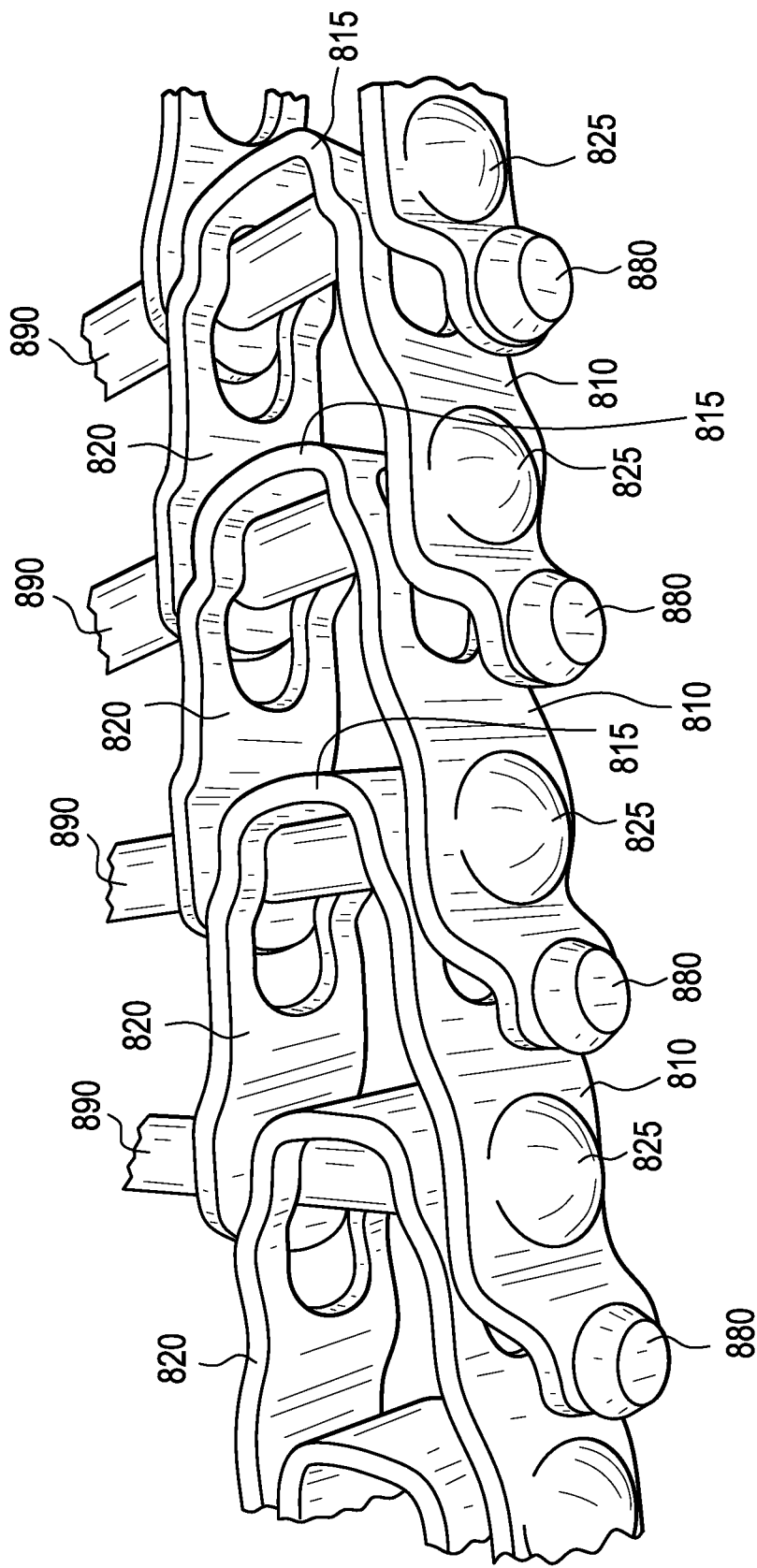
FIG. 9 is a side perspective view of a conveyor belt comprising extended leg link members having wear components in accordance with an embodiment of the invention.
Figure 10:
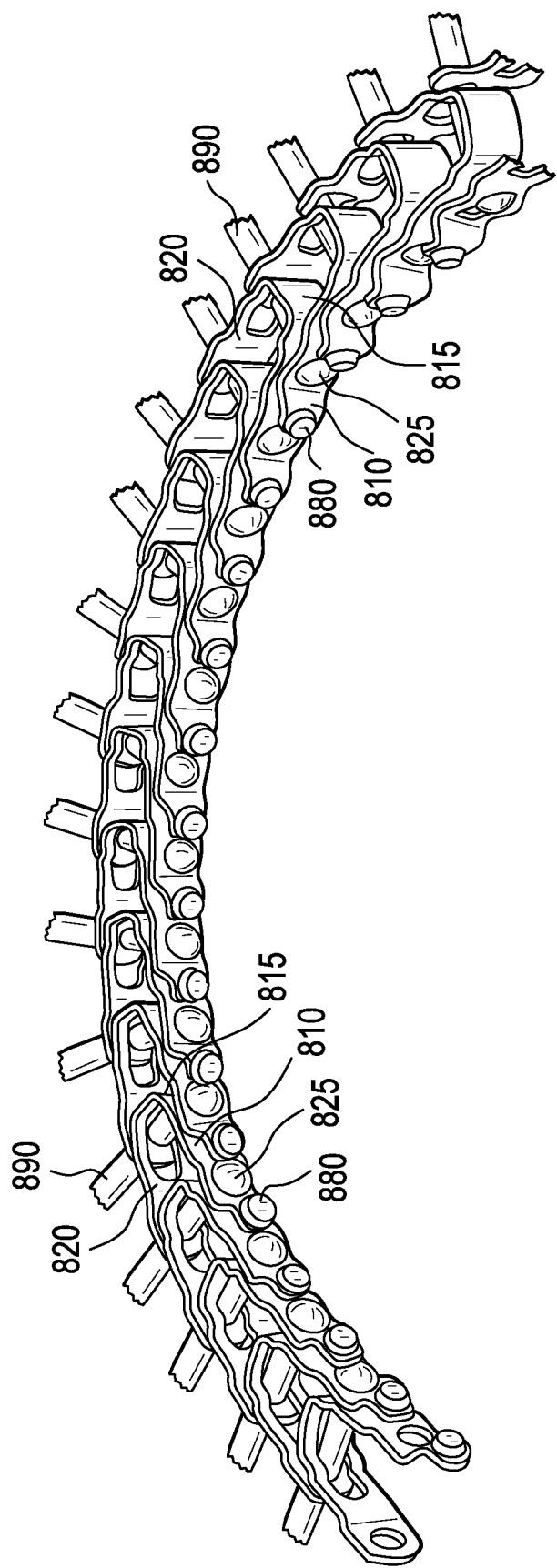
FIG. 10 is a side perspective view of a conveyor belt comprising extended leg link members having wear components in accordance with an embodiment of the invention.

FIGS. 8-10 are top perspective views and side perspective views of a conveyor belt 800 comprising extended leg link members having wear components 880, in accordance with an implementation of the invention. As described previously, each extended leg link member has a first leg portion 810 and a second leg portion 820. A connecting portion 815 connects each first leg portion 820 and second leg portion 820. As in FIG. 7, first leg portion 810 is longer than second leg portion 820, i.e., first leg portion 810 extends further proximally than second leg portion 820 in at least one direction away from second leg portion 820. The portion of first leg portion 810 extending beyond second leg portion 820 is referred to as the "extended portion" of first leg portion 810.

Pivot rods 890 interconnect first openings of first and second leg portions of one extended leg link member with the second openings of first and second leg portions of an adjacent link member, and are welded to the first leg portions of the extended leg link member at an end 825. The extended leg link members and pivot rods can be made of any material, and can be made of, for example, stainless steel or another metal.

Wear components 880 are removably positioned in a third opening on the extended portion of each first leg portion 810. Wear component 880 has a head portion, a single leg portion and a central portion between the head portion and the leg portion. The head and leg portions of wear component 880 have a larger diameter than the central portion in order to retain wear component 880 within the third opening. As shown in this embodiment, the head portion of wear component 880 is flat. However, it is contemplated that the head portion can instead be rounded or any other shape.

In order to insert wear component 880 into the third opening, the leg portion of wear component 880 is aligned with the third opening; in this case, a hole. Wear component 880 is then pushed or snapped into the hole such that the head portion of wear component 880 protrudes on one side of first leg portion 810, and the leg portion of wear component 880 protrudes on the opposite side of first leg portion 810. Although shown and described with respect to a single leg portion, it is contemplated that wear component 880 can have two or more leg portions that can be compressed and pushed into the slot (such as is shown with two leg portions in FIG. 5). In either embodiment, the head portion of wear component 880 protrudes beyond the weld 825 between pivot rod 890 and first leg portion 810 in order to provide a wear surface between the extended link members of the conveyor belt and a spiral cage driving the conveyor belt, as discussed further herein.

The link members and conveyor belts described with respect to FIGS. 1-10 herein can be used in spiral ovens driven by spiral cages made with evenly spaced vertical bars or a smooth cage surface. Due to the high temperatures required in an oven, the cage surface that would normally be covered with plastic in ambient or freezing applications is instead made with stainless steel. Similarly, in these applications, the described link members and pivot rods can also be made of stainless steel.

However, the wear components described herein with respect to FIGS. 1-10 can be made of a high-temperature plastic, i.e., a plastic having a melting point above 200° F. Such plastics include, but are not limited to, acrylic (PMMA), polyoxymethylene (POM or acetal), polybutylene terephthalate (PBT), polyethylene terephthalate (PET), polycarbonate (PC), polyhydroxylalkanoates (PHAs), polyester, polyethylene (PE), polyether ether ketone (PEEK), polypropylene (PP), polystyrene (PS), polyvinylidene chloride (PVDC) and styrene-acrylonitrile (SAN). For extremely high temperature applications, polyether ether ketone (PEEK) is preferred, as it has a melting point of approximately 650° F.

Because high-temperature plastics such as polyether ether ketone (PEEK) can be expensive in large volumes, described embodiments are cost-effective in that only the wear components need be made of such materials, and standard stainless steel can be maintained on the spiral cages, link members and pivot rods. The described wear components create a uniform wear surface that contact the metal spiral cage. Over time and use, the described wear components that become worn down can be easily removed, disposed of, and replaced by a new wear component, as described above.

The present invention has been described in relation to particular examples, which are intended in all respects to be illustrative rather than restrictive. Those skilled in the art will appreciate that many different combinations of materials and components will be suitable for practicing the present invention.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A conveyor belt comprising:
   a plurality of link members, each link member comprising:
      first and second leg portions, each leg portion comprising a first opening at a proximal end and a second opening at a distal end; and
      a connecting portion that connects the first and second leg portions at the distal end thereof;
   a plurality of pivot rods, each pivot rod received in the first opening of each leg portion of one of the plurality of link members and the second opening of each leg portion of an adjacent link member, each pivot rod including a weld to one of the plurality of link members; and
   a plurality of wear components, each wear component attached to one of the plurality of link members or one of the plurality of pivot rods,
   wherein the first leg portion comprises a third opening, and wherein the third opening is through the first leg portion.

2. The conveyor belt of claim 1, wherein the plurality of wear components are made of a high-temperature plastic.

3. The conveyor belt of claim 2, wherein the high-temperature plastic is polyether ether ketone (PEEK).

4. The conveyor belt of claim 1, wherein each pivot rod is welded to the first leg portion of one of the plurality of link members.

5. The conveyor belt of claim 4, wherein each wear component covers the weld of one of the plurality of pivot rods.

6. The conveyor belt of claim 1, wherein the first leg portion is longer than the second leg portion.

7. The conveyor belt of claim 1, wherein one of the plurality of wear components is received in the third opening.

8. The conveyor belt of claim 7, wherein one of the plurality of wear components is snapped into the third opening.

9. The conveyor belt of claim 7, wherein the third opening is positioned between the first opening and the second opening on the first leg portion.

10. The conveyor belt of claim 7, wherein the third opening is positioned between the first opening and a proximal end of the first leg portion.

11. The conveyor belt of claim 1, wherein the plurality of wear components are configured to contact a spiral cage.

12. The conveyor belt of claim 11, wherein the spiral cage is metal.

13. The conveyor belt of claim 12, wherein the plurality of link members and the plurality of pivot rods are metal.

14. The conveyor belt of claim 1, wherein each pivot rod further includes a button head at an end thereof.

15. The conveyor belt of claim 14, wherein each wear component covers the button head of one of the plurality of pivot rods.

16. The conveyor belt of claim 15, wherein each wear component is snapped on to the button head.

17. The conveyor belt of claim 1, wherein the plurality of wear components are disposable.

18. The conveyor belt of claim 1, wherein the plurality of wear components are replaceable.

19. The conveyor belt of claim 1, wherein each wear component is threaded on to an end of one of the plurality of pivot rods.

20. The conveyor belt of claim 1, wherein each wear component is snapped on to an end of one of the plurality of pivot rods.

21. The conveyor belt of claim 1, wherein each wear component is attached to one of the plurality of link members or one of the plurality of pivot rods with adhesive.

22. The conveyor belt of claim 1, wherein one of the plurality of wear components is received in the third opening.

23. The conveyor belt of claim 22, wherein one of the plurality of wear components is snapped into the third opening.

24. The conveyor belt of claim 22, wherein the third opening is positioned between the first opening and the second opening on the first leg portion.

25. The conveyor belt of claim 22, wherein the third opening is positioned between the first opening and a proximal end of the first leg portion.

26. A link member comprising:
   first and second leg portions, each leg portion comprising a first opening at a proximal end and a second opening at a distal end, and the first leg portion comprising a third opening;
   a connecting portion that connects the first and second leg portions at the distal end thereof; and
   a wear component received in the third opening,
   wherein the third opening is through the first leg portion.

27. The link member of claim 26, wherein the wear component is made of a high-temperature plastic.

28. The link member of claim 26, wherein the high-temperature plastic is polyether ether ketone (PEEK).

29. The link member of claim 26, wherein the first leg portion is longer than the second leg portion.

30. The link member of claim 26, wherein the wear component is snapped into the third opening.

31. The link member of claim 26, wherein the third opening is positioned between the first opening and the second opening on the first leg portion.

32. The link member of claim 26, wherein the third opening is positioned between the first opening of the first leg portion and a proximal end of the first leg portion.

33. The link member of claim 26, wherein the wear component is configured to contact a spiral cage.

34. The link member of claim 33, wherein the spiral cage is metal.

35. The link member of claim 26, wherein the first leg portion, the second leg portion and the connection portion are metal.

36. The link member of claim 26, wherein the wear component is disposable.

37. The link member of claim 26, wherein the wear component is replaceable.

38. The link member of claim 26, wherein the wear component is threaded into the third opening.

39. The link member of claim 26, wherein the wear component is at least one of mechanically and thermally deformed in the third opening.

40. The link member of claim 26, wherein the wear component is secured in the third opening with adhesive.

41. A conveyor belt comprising:
a plurality of link members, each link member comprising:
first and second leg portions, each leg portion comprising a first opening at a proximal end and a second opening at a distal end; and
a connecting portion that connects the first and second leg portions at the distal end thereof;
a plurality of pivot rods, each pivot rod received in the first opening of each leg portion of one of the plurality of link members and the second opening of each leg portion of an adjacent link member; and
a plurality of wear components, each wear component attached to one of the plurality of link members or one of the plurality of pivot rods,
wherein the first leg portion comprises a third opening, and wherein the third opening is through the first leg portion.

42. The conveyor belt of claim 41, wherein the plurality of wear components are made of a high-temperature plastic.

43. The conveyor belt of claim 42, wherein the high-temperature plastic is polyether ether ketone (PEEK).

44. The conveyor belt of claim 41, wherein the first leg portion is longer than the second leg portion.

45. The conveyor belt of claim 41, wherein the plurality of wear components are configured to contact a spiral cage.

46. The conveyor belt of claim 45, wherein the spiral cage is metal.

47. The conveyor belt of claim 46, wherein the plurality of link members and the plurality of pivot rods are metal.

48. The conveyor belt of claim 41, wherein each pivot rod further includes a button head at an end thereof.

49. The conveyor belt of claim 48, wherein each wear component covers the button head of one of the plurality of pivot rods.

50. The conveyor belt of claim 49, wherein each wear component is snapped on to the button head.

51. The conveyor belt of claim 41, wherein the plurality of wear components are disposable.

52. The conveyor belt of claim 41, wherein the plurality of wear components are replaceable.

53. The conveyor belt of claim 41, wherein each wear component is threaded on to an end of one of the plurality of pivot rods.

54. The conveyor belt of claim 41, wherein each wear component is snapped on to an end of one of the plurality of pivot rods.

55. The conveyor belt of claim 41, wherein each wear component is attached to one of the plurality of link members or one of the plurality of pivot rods with adhesive.

56. A conveyor belt comprising:
a plurality of link members, each link member comprising:
first and second leg portions, each leg portion comprising a first opening at a proximal end and a second opening at a distal end; and
a connecting portion that connects the first and second leg portions at the distal end thereof;
a plurality of pivot rods, each pivot rod received in the first opening of each leg portion of one of the plurality of link members and the second opening of each leg portion of an adjacent link member; and
a plurality of wear components, each wear component attached to one of the plurality of pivot rods,
wherein each wear component covers an end surface of the one of the plurality of pivot rods.

57. The conveyor belt of claim 56, wherein the plurality of wear components are made of a high-temperature plastic.

58. The conveyor belt of claim 57, wherein the high-temperature plastic is polyether ether ketone (PEEK).

59. The conveyor belt of claim 56, wherein one of the plurality of wear components is received in the third opening.

60. The conveyor belt of claim 59, wherein one of the plurality of wear components is snapped into the third opening.

61. The conveyor belt of claim 59, wherein the third opening is positioned between the first opening and the second opening on the first leg portion.

62. The conveyor belt of claim 59, wherein the third opening is positioned between the first opening and a proximal end of the first leg portion.

63. The conveyor belt of claim 56, wherein the plurality of wear components are configured to contact a spiral cage.

64. The conveyor belt of claim 63, wherein the spiral cage is metal.

65. The conveyor belt of claim 64, wherein the plurality of link members and the plurality of pivot rods are metal.

66. The conveyor belt of claim 56, wherein each pivot rod further includes a button head at an end thereof.

67. The conveyor belt of claim 66, wherein each wear component covers the button head of one of the plurality of pivot rods.

68. The conveyor belt of claim 67, wherein each wear component is snapped on to the button head.

69. The conveyor belt of claim 56, wherein the plurality of wear components are disposable.

70. The conveyor belt of claim 65, wherein the plurality of wear components are replaceable.

71. The conveyor belt of claim 56, wherein each wear component is threaded on to an end of one of the plurality of pivot rods.

72. The conveyor belt of claim 56, wherein each wear component is snapped on to an end of one of the plurality of pivot rods.

73. The conveyor belt of claim 56, wherein each wear component is attached to one of the plurality of link members or one of the plurality of pivot rods with adhesive.

* * * * *